United States Patent [19]

Gregory et al.

[11] 3,883,497

[45] May 13, 1975

[54] POLYPEPTIDES FROM UROGASTRONE

[75] Inventors: Harold Gregory; Ian Robert Willshire, both of Macclesfield, England

[73] Assignee: Imperial Chemical Industries Limited, London, England

[22] Filed: Oct. 29, 1973

[21] Appl. No.: 410,557

[30] Foreign Application Priority Data
Nov. 29, 1972 United Kingdom............... 55089/72

[52] U.S. Cl................. 260/112 R; 424/99; 424/177
[51] Int. Cl...... C07g 7/00; C08h 1/00; C07g 15/00
[58] Field of Search.................... 260/112 R; 424/99

[56] References Cited
UNITED STATES PATENTS
2,292,841   8/1942   Necheles............................... 424/99
2,357,103   8/1944   Gray..................................... 424/99

OTHER PUBLICATIONS
Chem. Abstracts, Vol. 44, 1950, 4532 e-g, Huff et al.
Chem. Abstracts, Vol. 71, 1969, 94747 Q, Vamamoto et al.
Chem. Abstracts, Vol. 50, 1956, 2729d-g, Gregory.
Chem. Abstracts, Vol. 74, 1971, 8591b, Lawrence et al.
Chem. Abstracts, Vol. 60, 1964, 13483c-e, Corbellini et al.
American Journal of Digestive Diseases, 1970, 15, 145-148, Gregory.
Chem. Abstracts, Vol, 70, 1969, 103318j, Morimoto et al.

*Primary Examiner*—Howard E. Schain
*Attorney, Agent, or Firm*—Cushman, Darby & Cushman

[57] ABSTRACT

The fractionation of crude urogastrone into three components and the purification of two of these components to give single polypeptides of molecular weight about 6,000. The isolated components inhibit the secretion of acidic gastric juice and may be used for this purpose in the form of pharmaceutical compositions.

3 Claims, No Drawings

POLYPEPTIDES FROM UROGASTRONE

This invention relates to polypeptides and more particularly it relates to polypeptides which possess the property of inhibiting the secretion of acidic gastric juice.

It has been known for many years, for example from "Science," 1939, 89, 489, that extracts of human urine could cause inhibition of the secretion of acidic gastric juice, and many attempts have been made to isolate and characterise the active material, usually called urogastrone. Previously it has always been considered that a single chemical entity was responsible for the biological properties of a crude urogastrone preparation, and the purest sample of urogastrone previously described (American Journal of Digestive Diseases, 1970, 15, 145–148) is said to be a single entity.

It has now been found that even this material is not homogeneous, and the basis of the present invention is the fractionation of crude urogastrone into at least three components, each of which is a most potent inhibitor of the secretion of acidic gastric juice, and the provision of two of these components in pure form. In this specification, these three components will be named as α-urogastrone, β-urogastrone and γ-urogastrone. α-Urogastrone is still considered to be inhomogeneous, but β-urogastrone and γ-urogastrone are believed to be single entities.

Accordingly, the invention provides as distinct chemical entities, β-urogastrone and γ-urogastrone, being white, water soluble, acidic polypeptides consisting of a single polypeptide chain with three internal disulphide bonds and having molecular weights of about 6,000: the β-component showing the following physical properties:

paper chromatography in n-butanol: acetic acid: pyridine: water (30:6:24:20) — single spot $R_F$ 0.59;
paper electrophoresis in pyridine acetate at pH 6.5 — a small oval area moving slightly anodically;
paper electrophoresis in acetic acid/formic acid at pH 2.1 — a 'comet' with front mobility of 1.75 relative to ε-DNP lysine; acrylamide gel electrophoresis in 0.1M tris/hydrochloric acid buffer at pH 8.9 — a single spot moving towards the anode with a mobility of 0.53 relative to bromophenol blue;
isoelectric point — pH 4.5;
giving an amino-acid ratio on analysis of aspartic acid 7, serine 3, glutamic acid 5, proline 1, glycine 4, alanine 2, valine 3, cysteine 6, methionine 1, isoleucine 2, leucine 5, tyrosine 5, histidine 2, lysine 2, tryptophan 2 and arginine 3, and having a specific activity, as defined later, of 0.2 to 0.5 μg./kg.;

the γ-component showing the following physical properties:
paper chromatography in n-butanol: acetic acid: pyridine: water (30:6:24:20) — single spot $R_F$ 0.63;
paper electrophoresis in pyridine acetate at pH 6.5 — a small oval area moving slightly anodically;
paper electrophoresis in acetic acid/formic acid at pH 2.1 — a 'comet' with front mobility 1.57 relative to ε-DNP lysine;
acrylamide gel electrophoresis in 0.1M tris/hydrochloric acid buffer at pH 8.9 — a single spot moving towards the anode with a mobility of 0.65 relative to bromophenol blue;
isoelectric point — pH 4.3;
giving an amino-acid ratio on analysis of aspartic acid 7, serine 3, glutamic acid 5, proline 1, glycine 4, alanine 2, valine 3, cysteine 6, methionine 1, isoleucine 2, leucine 5, tyrosine 5, histidine 2, lysine 2, tryptophan 2 and arginine 2, and having a specific activity, as defined later, of 0.2 to 0.5 μg./kg.

The fractionation of crude urogastrone to give the three components defined above uses similar techniques to those described in general terms in the paper in Amer. J. Dig. Dis. referred to above, but the final stages are a considerable improvement over the preparative electrophoresis previously described in that the yield and purity of the final product is much higher. The purity of a urogastrone preparation is difficult to assess by chromatographic methods unless the preparation is in fact highly purified, and the specific biological activity of the preparation is considered to be the best guide to purity. In this specification, the specific biological activity means the amount of the preparation expressed in μg./kg. which on administration by intravenous injection to a dog provided with a Heidenhain pouch and whose secretion of gastric acid is stimulated to 60–80 percent of the maximum level of secretion by an infusion of histamine, causes a 50–70 percent inhibition of that acid secretion. Some variation in the specific activity of a particular sample is found if it is measured in different dogs, and for the most accurate comparison of the specific activities of different samples, the same dog should be used for the measurement.

According to the invention there is provided a process for the fractionation of crude urogastrone into three components which comprises the steps of:

a. applying a sample of a urogastrone preparation having a specific activity as defined above of 5–10 μg./kg. to a column of carboxymethyl cellulose equilibrated with an 0.01 molar aqueous buffer of pH 4.5, eluting the column with a buffer of pH 5.0 with a concentration gradient of 0.01 molar to 0.5 molar, and collecting the eluted material showing the biological activity, b. applying the biologically active material from step (a) to a column of a porous polyacrylamide gel excluding molecules of molecular weight greater than 5,000 in an 0.05 molar aqueous buffer solution of pH 7.2 and composed of volatile components, eluting the column with the same solution, and collecting the eluted material showing the biological activity, c. applying the biologically active material from step (b) to a column of aminoethyl cellulose equilibrated with an 0.01 molar aqueous buffer of pH 5.5 composed of volatile components, eluting the column with a buffer of the same molarity and then with a buffer having a concentration gradient of from 0.01 molar to 0.3 molar, detecting the presence of three peaks of eluted material each showing the biological activity and collecting separately the material of each peak which contains α-urogastrone, β-urogastrone or γ-urogastrone, respectively, followed by, in the case of material from the peak from step (c) containing β-urogastrone, applying the material to a column of carboxymethyl cellulose equilibrated with an 0.01 molar aqueous buffer of pH 5.0, eluting the column with a buffer of pH 5.0 with a concentration gradient of from 0.01 molar to 0.5 molar, collecting the eluted material showing the biological activity, applying this material to a column of a porous polyacrylamide gel excluding molecules of molecular weight greater than 5,000 in an 0.05 molar aqueous buffer of pH 7.2 and composed of volatile components, eluting the column with the same solution and collecting the eluted material showing the biological activity; or followed by in the case of material from the peak from step (c) containing γ-urogastrone, applying the material to a column of carboxymethyl cellulose equilibrated with an 0.01 molar aqueous buffer of pH 4.8, eluting the column with a buffer of pH 4.8 with a concentration gradient of from 0.01 molar to 0.5 molar, collecting the eluted material showing the biological activity, applying this material to a column of a porous polyacrylamide gel excluding molecules of molecular weight greater than 5,000 in an 0.05 molar aqueous buffer of pH 7.2 and composed of volatile components, eluting the column with the same solution and collecting the eluted material showing the biological activity.

By the expression "composed of volatile components " is meant that the buffer solution when freeze-dried under high vacuum is totally volatile. Such bufferr is usually composed of a mixture of salts derived from ammonia or an amine as the base and a weak organic acid, for example ammonium acetate, or a mixture of ammonium acetate and acetic acid.

The buffer solutions used in the chromatography on the carboxymethyl cellulose columns are conveniently mixtures of sodium acetate and acetic acid, the buffer solutions used in the chromatography on the aminoethyl cellulose column are conveniently mixtures of ammonium acetate and acetic acid, and the buffer solutions used in the chromatography on the porous polyacrylamide gel excluding molecules of molecular weight greater than 5,000 are conveniently ammonium acetate solutions.

The presence of material in the eluate from any column is conveniently detected by measuring the extent to which fractions of the eluate absorb ultraviolet light of a wavelength of 280 mμ, and the biological activity of the material in such fractions is measured as set out above. The material is conveniently collected by lyophilysing the appropriate fractions of the eluate.

The starting material may be obtained as generally described in the paper in Amer. J. Dig. Dis referred to above or as particularly described in the accompanying Example.

As indicated above, the components of urogastrone defined above possess the property of inhibiting the secretion of acidic gastric juice. This property is demonstrated by their action in inhibiting the secretion of acidic gastric juice in dogs provided with a Heidenhain pouch and whose gastric secretion is stimulated by histamine, or by their action in inhibiting the secretion of acidic gastric juice in humans whose gastric secretion is stimulated by pentagastrin. The demonstration of this effect in dogs is carried out as indicated later in the determination of the specific activity of a sample, and in humans, the effect is demonstrated as follows:

A human subject fasts overnight and then swallows a nasogastric tube. A solution of pentagastrin in isotonic saline is infused into the subject at a rate of 0.2 μg./kg./hour, and gastric juice is aspirated at 15 minute intervals. The acidity of the gastric juice is determined by titration, and when a steady rate of secretion has been reached, a separate infusion of a solution of β- or γ-urogastrone in isotonic dextrose is introduced at a rate of 0.25 μg./kg./ hour. This infusion is continued for 1 hour during which the rate of acid secretion is reduced by 60–80 percent of the previous steady rate.

This physiological effect is of value in the treatment of duodenal ulcers, and under the above conditions, no serious toxic effects are observed.

In animals, for example rats, rabbits and marmosets, doses of up to 50 μg./kg. have been given without apparent serious toxic effects.

When used to produce an inhibition of gastric acid secretion in warm blooded animals, a wide range of doses may be used, for example from 0.05 to 10 μg./kg., depending upon the circumstances and extent of inhibition required. The dose may be administered by injection, especially intravenous injection, or it may be administered by intravenous infusion. In either case, the effect lasts for about 1½ hours after completion of the injection of infusion. When so used in man, an effective dose can be from 5 to 500 μg., administered by injection or infusion. When used in the treatment of a duodenal ulcer, the dose should be repeated or a depot formulation used.

The components or urogastrone defined above may be administered in the form of pharmaceutical compositions, and so according to a further feature of the invention there is provided a pharmaceutical composition comprising a component of urogastrone as defined above and a pharmaceutically-acceptable diluent or carrier.

The components β-urogastrone or γ-urogastrone are preferred for use in compositions, and preferred compositions are those suitable for parenteral administration or for the preparation of such compositions. Examples of suitable such compositions are sterile, injectable solutions or suspensions, sterile injectable depot formulations or a sterile powder ready for dissolution or suspension in a sterile diluent or solvent. Such injectable solutions or suspensions in which the active ingredient is directly distributed through the host's body may contain from 0.5–500 μg./ml., but a depot formulation from which the active ingredient is slowly reached by body fluid may contain up to 2 mg. of active ingredient. A particularly convenient sterile injectable solution is a sterile solution in isotonic saline or isotonic dextrose.

The invention is illustrated but not limited by the following Example in which the specific chromatography materials referred to be manufacturer's trade mark or code are available as follows:

carboxymethyl cellulose, Whatman CM 52 from W.R. Balston Ltd., Maidstone, Kent, U.K.

a porous polyacrylamide gel excluding molecules of molecular weight greater than 5,000, Biogel P6 from Bio-Rad Laboratories, Richmond, Calif., U.S.A.

aminoethyl cellulose, A-E Cellex from Bio-Rad Laboratories, Richmond, Calif., U.S.A.

kieselguhr, Celite 545 from Johns Manville (Great Britain) Ltd., Richmond, Surrey, U.K.

weakly basic ion-exchange resin, Deacidite G-IP 3–5 percent DVB from The Permutit Company, Isleworth, Middlesex, U.K.

porous cross-linked dextran gel, Sephadex G-50 and G-25 from Pharmacia Fine Chemicals AB, Uppsala, Sweden.

In the case of each stage involving the use of a chromatography column, the eluate was collected in fractions consisting of a defined number of drops using an Ultrorac LKB 7,000 fraction collector (LKB Instruments Ltd., Croydon, Surrey, U.K.) and these fractions assayed for peptide material by measuring the U.V. absorption at 280 mµ. The material was then collected in fractions and the material assayed for biological activity as follows:

Dogs were prepared with separated denervated fundic pouches, and a subcutaneous infusion of histamine was used to stimulate gastric secretion to approximately 60–80 percent of the maximal rate (usually an infusion of a solution of 600 µg. of histamine (expressed as base) in 0.48 ml. per hour is adequate). A known weight of test material was dissolved in isotonic saline and, when the dog was secreting gastric juice at a steady rate, a single intravenous injection of a known amount material was administered. The inhibition of gastric secretion was noted and from the known dose response curve, the dose in µg./kg. to produce a 50–70 percent inhibition was then calculated.

Amino-acid analyses were carried out using a Locarte Amino-acid Analyser (Locarte Ltd., 24 Emperors Gate, London S.W.7).

All column chromatography was carried out at 4°C., and all the buffers solutions were saturated with toluene.

EXAMPLE 1

Separation of crude urogastrone into three components

A column (20 cm. long × 1.4 cm. in diameter) was packed with carboxymethyl cellulose (Whatman CM 52) and equilibrated with 0.01 M sodium acetate-acetic acid buffer of pH 4.5. A urogastrone preparation (100 mg.) with specific activity of 5–10 µg./kg. was dissolved in 20 ml. water and applied to the column at a flow rate of 15 ml. per hour. After application, the column was eluted at the same rate with pH 5.0 sodium acetate-acetic acid buffer using a gradient of 0.01 M to 0.5 M (200 ml. of each buffer) and collecting fractions of 100 drops. The biologically active material was detected in fractions 46–54 which were combined and lyophilised to give material containing sodium acetate as well as polypeptide.

The whole of material obtained above was dissolved in water (2 ml.) and applied to a column (85 × 1.5 cm.) of porous polyacrylamide gel excluding molecules of molecular weight greater than 5,000 (Biogel P6; 200–400 mesh) equilibrated with 0.05 M aqueous ammonium acetate. The column was eluted with this solution at a flow rate of 7 ml. per hour and fractions of 66 drops collected. The biologically active material was found in the eluate fractions 27 to 42 and freeze-drying of these fractions gave 35 mg. of material having a specific activity of 3–5 µg./kg.

The whole of this material was then dissolved in water (5 mg./ml.) and applied to at a flow rate of 4 ml. per hour to a column (10 × 1 cm.) packed with aminoethyl cellulose (A-E Cellex) equilibrated with 0.01 M ammonium acetate-acetic acid buffer of pH 5.5. After 10 fractions each of 66 drops had been collected, the column was eluted with a gradient of 0.01 M to 0.3 M buffer (40 ml. of each buffer). The biologically active material was found in three groups of fractions, 24–29, 30–33 and 34–42 which were kept separate and lyophilised to give, from fractions 24–29, α-urogastrone, from fractions 30–33, material consisting mainly of β-urogastrone (6 mg.) having a specific activity of about 1 µg./kg., and from fractions 34–42, material consisting mainly of γ-urogastrone (6 mg.) having a specific activity of about 1 µg./kg.

Further purification of β-urogastrone

A column (32 × 1 cm.) was packed with carboxymethyl cellulose (Whatman CM 52) and equilibrated with 0.01M sodium acetate-acetic acid buffer of pH 5.0. The material consisting mainly of β-urogastrone obtained above was dissolved in water (2 mg./ml.) and applied to the column at 5 ml. per hour. The column was then eluted at the same rate with pH 5.0 sodium acetate-acetic acid buffer using a gradient of 0.01M (130 ml.) to 0.5M (65 ml.) and collecting fractions of 66 drops. The biologically active material was detected in the peak falling between fractions 50–60 which were combined and lyophilised.

The whole of the material obtained as above was dissolved in water (1 ml.) and applied at a flow rate of 3 ml. per hour to a column (100 × 1 cm.) of porous polyacrylamide gel excluding molecules of molecular weight greater than 5,000. (Biogel P6; 200–400 mesh) equilibrated with 0.05 M ammonium acetate. The column was eluted with this solution at the same flow rate and fractions of 30 drops collected. The biologically active material was detected in fractions 28–39. These were combined and lyophilised to give 2–4 mg. of β-urogastrone having the following properties:

1. specific activity — 0.2–0.5 µg./kg.
2. amino-acid ratio on analysis — Asp 7, Ser 3, Glu 5, Pro 1, Gly 4, Ala 2, Val 3, Cys 6, Met 1, Ile 2, Leu 5, Tyr 5, His 2, Lys 2, Trp 2, Arg 3.
3. isoelectric point — pH 4.5 by isoelectric focussing.
4. single spot $R_F$ 0.59 in paper chromatography in n-butanol: acetic acid: pyridine: water (30:6:24:20).
5. a comet with front mobility of 1.75 relative to ε-DNIP lysine on paper electrophoresis in acetic acid/formic acid at pH 2.1 (20 ml. formic acid, 80 ml. acetic acid made up to 1 litre with water).
6. a small oval area moving slightly anodically on paper electrophoresis in pyridine acetate at pH 6.5 (3 ml. acetic acid, 100 ml. pyridine made up to 1 litre with water).
7. a single spot mobility 0.53 relative to bromophenol blue on acrylamide gel electrophoresis in 0.1M tris-hydrochloric acid buffer at pH 8.9.

Further purification of γ-urogastrone

The procedure described above for the further purification of β-urogastrone was repeated with the material consisting mainly of γ-urogastrone except that chromatography on carboxymethyl cellulose was carried out at pH 4.8 instead of at pH 5.0, and the final product from the column of porous polyacrylamide gel was detected in fractions 30–41. The γ-urogastrone so obtained had the following properties:

1. specific activity — 0.2–0.5 µg./kg.
2. amino-acid ratio on analysis — Asp 7, Ser 3, Glu 5, Pro 1, Gly 4, Ala 2, Val 3, Cys 6, Met 1, Ile 2, Leu 5, Tyr 5, His 2, Lys 2, Trp 2, Arg 2.
3. isoelectric point — pH 4.3 by isoelectric focussing.
4. single spot $R_F$ 0.63 on paper chromatography in n-butanol: acetic acid: pyridine: water (30:6:24:20).
5. a comet with front mobility of 1.57 relative to ε-DNP lysine on paper electrophoresis in acetic acid/formic acid at pH 2.1 (20 ml. formic acid, 80 ml. acetic acid made up to 1 litre with water).

6. a small oval area moving slightly anodically on paper electrophoresis in pyridine acetate at pH 6.5 (3 ml. acetic acid, 100 ml. pyridine made up to 1 litre with water).
7. a single spot mobility 0.65 relative to bromophenol blue on acrylamide gel electrophoresis in 0.1M tris-hydrochloric acid buffer at pH 8.9.

The starting material, a urogastrone preparation with specific activity of 5–10 $\mu$g./kg., was obtained as follows:

Human, male urine was collected over 24 hour periods in vessels containing sufficient chloroform to give a saturated solution at all times. The collected urine was stirred rapidly while the pH was adjusted to 5 using glacial acetic acid (ca. 2.2 ml./l. of urine). A 25 percent w/v aqueous solution of tannic acid B.P. was added in the proportion of 20 ml. per litre of urine, and about 1 hour later, acid washed kieselguhr (Celite 545) was added (ca.1g./l.). The suspension was stirred and the precipitate allowed to settle overnight. The supernatant liquid was siphoned off and the residue transferred to a large sintered glass funnel previously provided with a thin layer of kieselguhr. The precipitate was washed with a little water and then with methanol until the washings were colourless. The precipitate was then dried, transferred to a beaker and blended into a thin paste with methanol containing 1 percent v/v of concentrated hydrochloric acid. The paste was filtered and the residue washed with the above acidic methanol until the washings were colourless. A total of 5 ml. of acidic methanol was used per litre of urine used initially. The combined filtrates were then slowly diluted with four volumes of acetone and the precipitate so formed allowed to settle. The supernatant liquid was decanted and the precipitate collected by centrifugation. The residue (ca. 20 mg./l. of urine) was then washed twice with acetone and dried under vacuum.

A weakly basic ion-exchange resin (Deacidite G-IP, 3–5 percent DVB, 100–200 mesh) was converted to the acetate form, packed in a column (35 × 2.8 cm.) and washed with 2M acetic acid and then water. The product obtained above (20 g.) was dissolved in water, the solution adjusted to pH 5–6, diluted to 2 l. and then filtered through the resin at a rate of 80 ml. per hour. The column was washed with water until the eluate was clear, and then eluted with 50 percent v/v aqueous acetic acid (400 ml.) to give a dark eluate which was evaporated under reduced pressure and finally lyophilised to a powder.

A column (100 × 2.8 cm.) of porous cross-linked dextran gel (Sephadex G-50) was equilibrated with 0.1M ammonium bicarbonate, and a solution of the whole of the product from the previous stage in water (20 ml.), adjusted to pH 7 with 0.88 ammonia, together with washings (2 × 2 ml.) was applied to the column. The column was developed with 0.1M ammonium bicarbonate at a flow rate of 40 ml. per hour, and the eluate fractions between 350 and 550 ml. eluate volume were combined and lyophilised to give ca. 600 mg. of material with specific activity of 100–200 $\mu$g./kg.

The material from four batches of the previous stage was then subjected to solvent extraction using two systems:
a. Redistilled t-butanol (150 ml.) water (150 ml.) and ammonium sulphate (30 g.)
b. Redistilled isopropanol (300 ml.), water (300 ml.) and ammonium sulphate (60 g.)

each equilibrated at room temperature.

The material (2.4 g.) was dissolved in the lower phase of system (a) (40 ml.) and placed in a 100 ml. centrifuge tube. The same lower phase of system (a) (30 ml.) was also placed in each of three more such tubes, and the first tube extracted with 30 ml. of the upper phase of system (a). The extract was transferred to each of the other tubes in succession and the whole process repeated three times; the tubes being centrifuged between each extraction to give a clear upper phase. The combined upper phases were then discarded, and the lower phases were extracted with 8 successive volumes (30 ml.) of the upper phase of system (b). The 8 extracts after passage over the four tubes containing the lower phase of system (a) were then combined, evaporated under reduced pressure at a temperature below 35°C. and finally lyophilised to a powder.

The whole of this powder was dissolved in water (35 ml.) and applied to a column (100 × 3.3 cm.) of porous cross-linked dextran gel (Sephadex G-25) equilibrated with 0.4M acetic acid. The column was developed with 0.4M acetic acid at a flow rate of 50 ml. per hour and fractions of 10 ml. collected. The biologically active material was detected in the fractions 43–68. These were combined and lyophilised to a powder (ca.1g.) having a specific activity of 50–100 $\mu$g./kg.

A column (24 × 3.2 cm.) was packed with carboxymethyl cellulose (Whatman CM 52) and equilibrated with 0.01M ammonium acetate-acetic acid buffer of pH 4.5. A solution of the whole of the product from the previous stage in water (10 mg./ml.) was applied to the column at a flow rate of 45 ml. per hour. The column was eluted with 0.01M ammonium acetate-acetic acid buffer of pH 4.5 until the eluate no longer contained material absorbing at 280 m$\mu$. The column was then eluted with ammonium acetate-acetic acid buffer using a gradient from 0.01 M, pH 4.5 (500 ml.) to 0.2 M, pH 6.7 (500 ml.). The biologically active material was detected in a single peak, and the eluate was lyophilised.

The whole of the material from the previous stage was then dissolved in the minimum volume of water (ca. 2 ml.), and applied to a column (120 × 1.6 cm.) of porous polyacrylamide gel (Biogel P6; 200–400 mesh) equilibrated with 0.2M acetic acid. The column was eluted with the same solvent at a flow rate of 10 ml. per hour and fractions of 99 drops were collected. The biologically active material was detected in the fractions 70–84 which were combined and lyophilised to give 100 mg. of a urogastrone preparation with specific activity of 5–10 $\mu$g./kg.

EXAMPLE 2

$\beta$-Urogastrone or $\gamma$urogastrone (10 mg.) was dissolved in pyrogen-free water (50 ml.) and the solution filtered through a sterilising membrane filtration system, for example a 0.22 m$\mu$ 'Millipore' filter ('Millipore' is a trade mark) into ampoules so that each ampoule received 0.5 ml. The contents of each vial were then lyophilised, and the ampoules sealed under sterile conditions. The ampoules, each containing 100 $\mu$g. of urogastrone, were kept at −20°C.

EXAMPLE 3

The contents of an ampoule, prepared as in Example 2, were dissolved in sterile, pyrogen-free 5 percent w/v dextrose solution to give 125 ml. of a solution containing 0.8 μg./ml. of urogastrone in 5 percent w/v dextrose solution. This solution was suitable or administration by infusion to inhibit the secretion of acidic gastric juice.

If a solution for injection is required, the contents of the ampoule are dissolved in 5 percent w/v dextrose solution to give a solution containing 5–50 μg./ml. of urogastrone.

Alternatively, the 5 percent w/v dextrose solution may be replaced by isotonic saline.

What we claim is:

1. A process for the fractionation of crude urogastrone into three components which comprises the steps of:
   a. applying a sample of a urogastrone preparation having a specific activity as defined above of 5–10 μg./kg. to a column of carboxymethyl cellulose equilibrated with an 0.01 molar aqueous buffer of pH 4.5, eluting the column with a buffer of pH 5.0 with a concentration gradient of 0.01 molar to 0.5 molar, and collecting the eluted material showing the biological activity,
   b. applying the biologically active material from step (a) to a column of a porous polyacrylamide gel excluding molecules of molecular weight greater than 5,000 in an 0.05 molar aqueous buffer solution of pH 7.2 and composed of volatile components, eluting the column with the same solution, and collecting the eluted material showing the biological activity,
   c. applying the biologically active material from step (b) to a column of aminoethyl cellulose equilibrated with an 0.01 molar aqueous buffer of pH 5.5 composed of volatile components, eluting the column with a buffer of the same molarity and then with a buffer having a concentration gradient of from 0.01 molar to 0.3 molar, detecting the presence of three peaks of eluted material each showing the biological activity and collecting, from the first eluted peak material which contains α-urogastrone, from the second eluted peak material which contains β-urogastrone, and from the third eluted peak material which contains γ-urogastrone, followed by, in the case of material from the peak from step (c) containing β-urogastrone, applying the material to a column of carboxymethyl cellulose equilibrated with an 0.01 molar aqueous buffer of pH 5.0, eluting the column with a buffer of pH 5.0 with a concentration gradient of from 0.01 molar to 0.5 molar, collecting the eluted material showing the biological activity, applying this material to a column of a porous polyacrylamide gel excluding molecules of molecular weight greater than 5,000 in an 0.05 molar aqueous buffer of pH 7.2 and composed of volatile components, eluting the column with the same solution and collecting the eluted material showing the biological activity: or followed by in the case of material from the peak from step (c) containing γ-urogastrone, applying the material to a column of carboxymethyl cellulose equilibrated with an 0.01 molar aqueous buffer of pH 4.8, eluting the column with a buffer of pH 4.8 with a concentration gradient of from 0.01 molar to 0.5 molar, collecting the eluted material showing the biological activity, applying this material to a column of a porous polyacrylamide gel excluding molecules of molecular weight greater than 5,000 in an 0.05 molar aqueous buffer of pH 7.2 and composed of volatile components, eluting the column with the same solution and collecting the eluted material showing the biological activity.

2. A process as claimed in claim 1 wherein the buffer solutions applied to columns of carboxymethyl cellulose are mixtures of sodium acetate and acetic acid, tthe buffer solutions applied to the column of aminoethyl cellulose are mixtures of ammonium acetate and acetic acid, and the buffer solutions applied to the columns of porous polyacrylamide gel excluding molecules of molecular weight greater than 5,000 are ammonium acetate solutions.

3. A process as claimed in claim 1 wherein the eluted material is collected by lyophilysing the elute.

* * * * *